Oct. 17, 1967     R. E. CURRAN     3,347,518

FAUCET STRUCTURES

Filed Nov. 8, 1962

INVENTOR.
ROBERT E. CURRAN

BY *Jerome Bauer*

ATTORNEY

United States Patent Office 3,347,518
Patented Oct. 17, 1967

3,347,518
FAUCET STRUCTURES
Robert E. Curran, 56 Grandview St.,
Huntington, N.Y. 11743
Filed Nov. 8, 1962, Ser. No. 236,260
5 Claims. (Cl. 251—333)

This invention relates to faucet structures and more particularly to improvements in the construction and operation of valve assemblies for such faucet structures.

In the past, faucet structures have been commonly made of metal castings principally because it was thought that the metal surfaces presented the greatest resistance to the wear and the corrosion to which the same were subjected. However, it has been found that chemicals in the fluids passing through the faucet structure attacked the valve parts and caused a deterioration of the same. Additionally, the continuous rubbing of the valve surface one against the other, and the pressures applied to such valve surfaces during their engagement and disengagement caused a rapid deterioration of these surfaces resulting in their abrasion and wearing away, causing the faucet to leak. Such faucet structures consequently required frequent repairs.

It is an object of this invention to provide improved valve assemblies for faucet structures, which assemblies will overcome the aforementioned problems of prior art faucet structures, will be less expensive to manufacture, easier to install, and more efficient in operation.

Another object of the invention is to provide valve assemblies for faucets in which all or any part of such assemblies may be molded or formed of low friction materials, as some of the plastic materials, such as those developed by E. I. du Pont de Nemours and Company under the trademarks "Delrin," "Nylon" and "Teflon."

Yet another object of the invention is to provide improved assemblies of valves and valve seats wherein the unique details of structure of the same enable them to be formed as separate elements to be connected together without the need for other fastening or assembling devices to retain the same in their connected relationship.

A further object of the invention is to provide a valve stem of unique details and a washer both of which are adapted to be connected together as a unitary operating mechanism without the need of external fastening or assembling devices.

Figure 1:
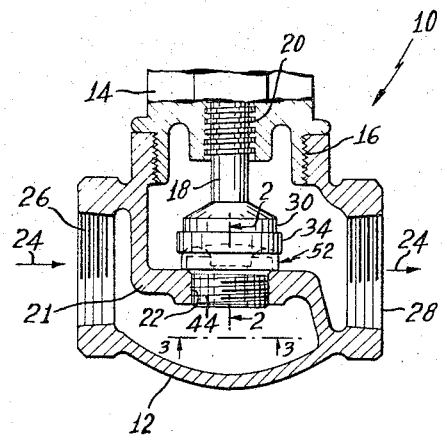
Figure 2:
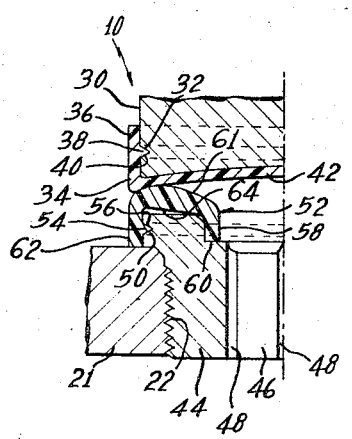
Figure 4:
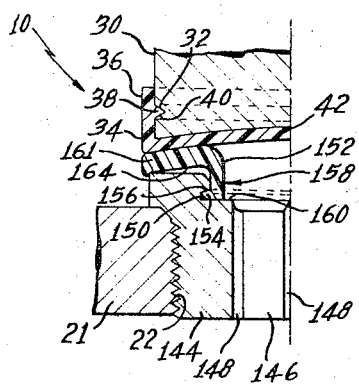
Figure 3:
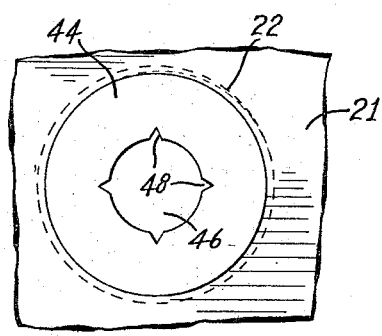
Figure 5:
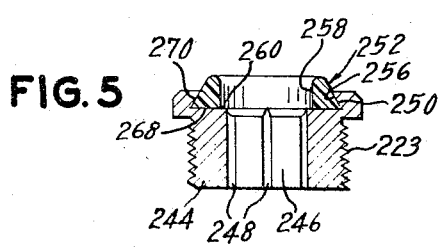

Other and further objects of this invention reside in the structures and arrangements hereinafter more fully described with reference to the accompanying drawing in which:

FIG. 1 is a vertical cross-section of a conventional faucet structure including a valve assembly constructed in accordance with the teaching of the invention, FIG. 2 is an enlarged cross-section of a portion of FIG. 1 taken in the direction of lines 2—2, FIG. 3 is an enlarged partial bottom view of FIG. 1 taken in the direction of lines 3—3, FIG. 4 is an enlarged partial cross-sectional view of a modification of the valve assembly of FIG. 1 as taken along lines 2—2 thereof, and FIG. 5 is a vertical cross-section through still another embodiment of an assembled valve seat and valve constructed according to the teaching of the invention.

Referring now to FIGS. 1 and 2 of the drawing, the faucet structure thereshown is generally identified by the numeral 10 that includes a body 12 capable of being cast or molded of any desired material such as the aforementioned low friction plastic materials. A closure plug 14 is removably threaded in the body 12 at 16 to close a portion of the body and to provide a housing for a valve stem 18 that is threaded in the same at 20 for longitudinal movement therein.

The body 12 may be of any conventional design. As most such bodies, it includes a divider 21 in which a fluid passage is defined and through which fluid moves in the direction of arrows 24 from the inlet side 26 to the outlet side 28. Each of these sides 26 and 28 is provided with a thread for connection to the inlet and outlet conduits respectively of a fluid line (not shown).

The valve stem 18 is connected to a faucet knob or handle that is positioned beyond the closure plug 14 and, therefore, not shown in the drawing. The stem 18, being threadingly engaged in the plug 14 at 20, moves longitudinally up and down relative to and within the plug 14 in response to the rotative operation of the knob or handle to which it is connected. The lower end of the stem 18 is illustrated in the drawing as including a rim 30 that has a circular periphery. The periphery of the rim 30 is provided with a groove 32 that is shown in the enlarged cross section of FIG. 2 in the shape of a V that completely rings the periphery or outer surface of the circularly shaped rim. Those skilled in the art will recognize that the V shape is shown for convenience of explanation only. This ringing groove may be of any other convenient shape that will enable it to perform the same function as that ascribed to the same hereinafter. For example, it can be arcuately shaped or it could have a plurality of flat sided walls other than that of a V shape.

A cup-shaped washer element 34 having an upstanding wall 36 is provided with a protrusion or flange 38. The cross-sectional shape of the protrusion 38 is substantially complementary to the shape of the groove 32 to cooperate with the walls thereof to retain the washer about the periphery of the rim 30. The protrusion may be ring-shaped or it may be interrupted about portions of its extent to result in a plurality of protruding fingers. However, the depth of the groove 32 and the extent of the protrusion 38 are such that the wall 36 must be deformed in order to force the rim 30 of the stem 18 into the cup-shaped washer element 34 until the protrusion 38 coincides with and fits matingly into the groove. Thereafter, the wall 36 automatically returns from its deflected position to its normal condition as shown in FIGS. 1 and 2 wherein it hugs the periphery of the rim 30 and is retained to such rim by the cooperating surfaces of the protrusion 38 and the defining surfaces of the groove 32.

Quite obviously, the shape of the groove 32 could be varied and correspondingly that of the protrusion 38. However, it is preferable that the lowermost surface 40 of both the groove and the protrusion be disposed at an angle directed radially inward and upward from the periphery of the rim 30, thereby assuring the application of a force whose vector tends to retain the protrusion 38 in the groove 32.

The lower end of the stem 30 facing the fluid passage 22 is concave as illustrated in exaggerated form in FIG. 2. In like manner, the lower portion or base 42 of the washer element 34 is shaped with a slight concavity, although in practice it has been found that the same need not be of the same or coinciding concave shape as that of the rim 30. In the drawings, both the rim 30 and the base 42 are shown to have the same concave shape.

Adapted to be releasably secured to and mounted within the fluid passage 22 is a valve seat 44. The valve seat 44 is threaded at its lower end about its outer periphery to be removably threadingly secured within such opening. It is also provided with a centrally disposed opening or fluid passage 46 that provides a communication between the fluid inlet 26 and the fluid outlet 28 of the faucet structure 10. In some faucet structures, the divider 21 may be thicker and, therefore, the opening 22 is larger or greater in length than is the valve seat 44. Hence, the fluid passage 46 of such valve seat constitutes a continuation of the faucet passage 22.

The wall of the opening 46 is broached to provide a plurality of longitudinally extending grooves 48 into which a tool may be inserted to enable the threaded insertion and threaded removal of the valve seat from the opening 22. This broaching is shown more clearly in FIG. 3. The opposite end of the valve seat 44 has an enlarged neck to provide a stop and shoulder that seats against the cast divider 21 that has opening 22 defined therein. This enlarged neck of the valve seat 44 is provided with a peripheral groove 50 that is circular in shape and extends completely thereabout.

A valve element 52 is substantially U-shaped in cross section and in the nature of an annulus that is adapted to encompass and fit over the enlarged neck or end of the valve seat that faces the valve stem 18. The valve element 52 includes a protrusion or flange 54 that is adapted to fit into and substantially coincide with the shape and contour of the defining walls of the groove 50. As in the description of the washer element 34, when the upper surface 56 of the groove and the protrusion is directed radially inward and downward from the outer periphery of the neck of the valve seat 44, the direction of the forces resulting from the engagement between the complementary surfaces of the protrusion and groove tend to constantly retain the valve element 52 in place about the end of the valve seat 44.

The opposite inner annular wall 58 is adapted to fit within a recessed portion of the valve seat 44 and longitudinal against a radially directed shoulder 60 spaced longitudinally inward from the end of the valve seat. The radial extent of the shoulder 60 of the valve seat is greater than that of the thickness of the wall 58, thereby disposing such wall 58 radially outward from the defining wall of the opening or fluid passage 46, as is more clearly shown in FIG. 2. The radially directed shoulder 61 connecting the walls 58 and 62 is rounded upward and radially outward. Its inner surface 64 is sloped at an angle relative to the flat facing end of the valve seat 44 for a purpose to be described.

In operation, when the valve stem 18 is rotated downwardly toward the valve element 52, the concave face of the base 42 of the washer 34 engages with the round contoured portion 61 of the valve element 52, thereby providing a fluid-tight seal between the same. As greater pressure is applied during rotation of the valve stem 18, the protrusion 38 permits the washer 34 to rotate within the groove 32. In like manner, the protrusion 54 permits the valve element 52 to rotate about the neck of its valve seat 44, thereby reducing or eliminating much of the abrasion that might result if such surfaces were moved over and relative to each other. This progressive tightening engagement between the washer 34 and valve 52 forces more of the concave face of the base 42 into greater area engagement with the rounded outer surface 61 of the valve element 52. The sloping inner surface 64 of the valve element (exaggerated in the drawing) is now forced physically downward into closer engagement with the flat end of the valve seat 44, permitting a tighter flatter engagement between the valve element surface 61 and the face of the base 42.

When the valve stem 18 is rotated in the opposite direction such that its washer 34 is lifted free of sealing engagement with the valve element 52, the fluid will move from the inlet 26 through the opening 46, in the valve seat 44, and outward about the annularly shaped valve 52 to the outlet 28. In practice, it has been found that when the wall 58 is recessed radially outward of the path of movement of the fluid through the opening 46, the moving fluid has a tendency to ride about and outward along the wall 58 rather than seeking to move between the shoulder 60 and the adjacent end of the wall 58, thereby eliminating chattering or other undesirable noises.

Referring now to the embodiment shown in FIG. 4, the details of the valve stem 18, including the rim 30, and the details of the valve washer 34 are substantially the same as that previously described. The embodiment of FIG. 4 differs from the embodiment of FIGS. 1 and 2 in the structural arrangements of the valve seat 144 and the valve element 152. In order that continuity of invention may be carried forth from FIGS. 1 and 2 and to eliminate much redundant and repetitious description, like details of elements in the present embodiment of the valve seat 144 and the valve element 152 corresponding to those of the previously described embodiment of FIGS. 1 and 2 will be numbered in the 100 series with the tens digits thereof corresponding to the tens digits of the previously described embodiment.

The valve seat 144, including the fluid passage 146, is adapted to be threadingly engaged in the opening 22 of the divider 21 of the faucet structure 10 in any convenient manner, such as by the securing threads thereshown or any other conventional means. The opposite enlarged neck of the valve seat 144 is recessed radially outward from the fluid passage 146 as defined by the shoulder 160 that is radially directed and longitudinally spaced from the flat end of the valve seat. At the radial outer end of the shoulder 160 there is defined a circularly shaped or ring-shaped groove 150 that includes a radially inwardly and downwardly directed surface 156 adapted to cooperate engagingly with a similarly shaped surface on a protrusion or flange 154 of the circular or ring-shaped valve element 152. The protrusion 154 extends radially outward and fits well within the confines of the groove 150. The radial inner wall 158 of the ring-shaped valve element 152 is positioned radially outward, well beyond the confines of the fluid passage 146.

The valve element 152 extends upward from the shoulder 160 of the valve seat 144 and then is curved to form a shoulder 161 that extends radially outward in facing relationship with the flat adjacent end of the valve seat 144. The shoulder 161 is shown in FIG. 4 of the drawing to extend radially beyond the confines of the valve seat 144 to coincide substantially with the diametric size of the valve washer 34. The shoulder 161 has its outer surface coinciding substantially in shape with the concave face of the base 42 of the washer 34 and is adapted to fluid-tightly engage with the same. As in the previously described embodiment, the inner surface 164 of the shoulder 161 slopes at a slight angle relative to the flat adjacent end of the valve seat 144. Thus, when the valve stem 18 and its rim 30 are rotated and moved downwardly, its washer 34 moves into area fluid-tight sealing engagement with the outer adjacent surface of the radially extending shoulder 161 of the valve element 152.

During continued downward rotative movement of the valve stem 18, the rim 30 continues to rotate with it while the washer 34 and valve element 152, being engaged with each other, can rotate relative to their respective supports 30 and 144 at their connected protrusions and grooves. Continued downward movement of the stem and engagement of the shoulder 161 with the washer base 42 causes the shoulder 161 to move tighter downward toward the flat adjacent surface of the end of the valve seat 144. When this occurs, the shoulder 161 becomes extended in position as its sloping underside 164 moves into tighter engagement with the adjacent flat end of the valve seat 144. The relationship of the cooperating surfaces of the protrusion or flange 154 with the groove 150 permits the valve element 152 to rotate relative to its valve seat 144 without becoming disconnected therefrom.

Because of the resilient nature of the material from which the valve element 152 is molded or manufactured, it may be applied to its end of the valve seat by pressing the wall 158 and its protrusion 154 downward into the recess of the valve seat 144 until such time as such protrusion or flange snaps into the groove. During the downward pressing movement of the valve element 152, the annular shape of the wall 158 is distorted. However, once the protrusion snaps into its mating groove, the wall 158 returns to its normal position. It has been found in practice that the valve element 152 cannot be removed or disconnected from its engagement with its valve seat 144 without distorting the wall 158. This is beneficial since it becomes almost impossible to disconnect the valve element 158 from its valve seat accidentally. The same is also true of the cooperation of the valve element 52 with its valve seat 44 of the prior described embodiment.

In the embodiment of FIG. 5, the valve seat 244 thereshown includes the threaded surface 223 that is adapted to be engaged in the opening 22 of the faucet structure 10 as described in the prior embodiments. The details of the embodiment of FIG. 5 will be identified by numerals in the 200 series, the tens numerals will coincide with the tens numerals of the previously described embodiments to eliminate repetitious and superflous descriptions.

In the instant embodiment of FIG. 5, the valve seat 244 is provided with a fluid passage 246 that terminates in a shoulder 260 that is directed radially outward. A ring or circularly-shaped groove 250 is defined in the neck of the valve seat 244 and includes a defining surface 256 that is directed annularly downward and radially outward from the end of the valve seat 244.

Mounted within the groove 250 is a valve element 252, ring-shaped and having a flat bottom surface 268 adapted to engage with the radially extending shoulder 260. The opening of the inner wall 258 of the valve element 252 is greater in diameter than that of the fluid passage 246. The valve element 252 has an angularly directed outer wall 270 that is adapted to be engaged with the surface 256. The height of the valve element 252 is such that it extends or projects longitudinally beyond the adjacent end of the valve seat 244 as do each of the valves 44 and 144.

Because the largest diameter of the ring-shaped valve element 252 is greater than that of the smallest diameter of the retaining surface 256, it is necessary to contract the valve element 252 and resiliently reduce it in size so it will snap into the groove 250 of the valve seat. This is capable of being accomplished with certain of the plastic materials such as "Delrin" and "Teflon" previously mentioned. However, certain other low friction plastic materials are not easily contracted in size to be force fit into the groove 250. In such case, the surface 256 of the groove 250 is initially formed substantially vertically, that is to say that its annular size may be slightly larger than the largest diameter of the valve element 252. With the surface 256 being of wider diameter at its narrowest point than that of the valve element, the valve element 252 may simply be dropped into the recess to rest upon the shoulder 260. Thereafter, the retaining surface 256 is spun and forced inwardly into tighter engagement with the annularly directed surface 270 in the valve element 252. This engagement between the surfaces 256 and 270 retains the valve element 252 seated against the shoulder 260 and approximates the details of structure shown in FIG. 5.

The operation of the embodiment of FIG. 5 is now accomplished in the same manner as in the previously described embodiments. The portion of the valve element 252 that extends beyond the adjacent end of the valve seat 244 will be engaged by the face of the concave base 42 of the washer 34 when the valve stem 18 is rotated downward toward the same. The extending end of the valve element 252 is slightly rounded. Hence, when the concave base 42 is moved downwardly into engagement with the same, the annularly directed surface 270 of the valve element cooperates with the annularly directed face of the concave base 42 to gradually move from line engagement into fluid-tight area engagement with the same.

Because of the annular relationship of the base 42 and the surface 270, the base surface 268 of the valve element 252 is moved into tighter seating engagement with its shoulder 260 of the valve seat and at the same time the surface 270 is caused to move outward into tighter retaining engagement with the retainer wall 256. It is noted that the groove and protrusion details are shown in the figures of the drawing in exact coinciding or mating relationship. In actual practice, there is some slight space between these surfaces that permits the valve element to rotate relative to the valve seat.

While there have been shown and described and pointed out the fundamental novel features of the invention as applied to several preferred embodiments thereof, it will be understood that various omissions and substitutions and changes in the form and details of the devices illustrated and in their operations may be made by those skilled in the art, without departing from the spirit of the invention. It is the intention, therefore, to be limited only as indicated by the scope of the claims appended hereto.

I claim:

1. In a faucet, a valve seat having a groove about its outer periphery, a resilient valve about the outer periphery of said valve seat and having a protrusion thereon extending into said peripheral groove to connect said valve with said valve seat, a shoulder on said valve overlying an end of said valve seat, said valve seat having a fluid opening defined therein and a recess forming a radially directed shoulder between the ends of said opening, and said valve having a leg accommodated in said recess and engaging said shoulder radially outward of said opening and an interior surface positioned over and facing said end of said valve seat.

2. In a faucet as in claim 1, a valve stem movable relative to said valve seat and valve and having an end facing the same, said valve stem having a groove defined in its outer periphery, a resilient washer encompassing said facing end of said valve stem and having a protrusion cooperable with the defining walls of said valve stem groove to connect said washer to said valve stem, and said washer having a concave surface engageable with said shoulder on said valve.

3. In a faucet, a valve seat having a hole defining a fluid passage therethrough and including a valve seating end, a groove defined in the interior of said valve seat directed radially outward from said hole and longitudinally spaced from said seating end, a ring-shaped valve having a protrusion directed radially outward and positioned in said groove to connect said valve with said valve seat, and a radially outwardly directed shoulder on said valve overlying at least a portion of said seating end of said valve seat and having an interior surface facing and initially partially spaced from said seating end.

4. In a faucet as in claim 3, a radially directed shoulder on said valve seat defining a wall of said groove, and said valve having a shoulder to engage said valve seat shoulder and being spaced radially outward from said fluid passage.

5. In a faucet as in claim 3, a valve stem movable relative to said valve seat and valve and having an end facing the same, said valve stem having a groove defined in its outer periphery, a washer encompassing said facing end of said valve stem and having a protrusion thereon cooperable with the defining walls of said valve stem groove to prevent their relative separation, and said washer having a concave surface engageable with said radially outwardly directed shoulder of said valve.

References Cited

UNITED STATES PATENTS

| | | | |
|---|---|---|---|
| 606,867 | 7/1898 | Hoover | 251—333 |
| 2,196,977 | 4/1940 | Campbell | 251—333 X |
| 2,701,119 | 2/1955 | Smith | 251—360 X |
| 2,920,861 | 1/1960 | Hartmann | 251—360 X |
| 3,050,082 | 8/1962 | Bass et al. | 251—317 X |
| 3,063,467 | 11/1962 | Roberts et al. | 251—332 X |
| 3,067,977 | 12/1962 | Anderson et al. | 251—317 X |

FOREIGN PATENTS

| | | | |
|---|---|---|---|
| 101,016 | 4/1962 | Netherlands | 251—332 |
| 375,857 | 5/1907 | France | 251—357 |
| 491,557 | 3/1953 | Canada | 251—357 |

M. CARY NELSON, *Primary Examiner.*

S. SCOTT, *Assistant Examiner.*